INVENTOR.
G. H. HANSON

INVENTOR.
G. H. HANSON

2,945,127
AUTOMATIC PROCESS CONTROL WITH RADIOISOTOPES

George H. Hanson, Idaho Falls, Idaho, assignor to Phillips Petroleum Company, a corporation of Delaware Filed Oct. 25, 1954, Ser. No. 464,286

20 Claims. (Cl. 250—43.5)

This invention relates to the use of radioisotopes in the automatic control of chemical processes.

The phenomenon of radioactivity (the emission of energy and/or mass from unstable atomic nuclei) has been recognized for more than half a century, but before 1945 the supply of radioactive isotopes in an appreciable concentration was limited to small quantities of some of the naturally occurring heavy metals, such as radium and thorium. The advent of the chain-reacting uranium pile has made possible the production in relatively large quantities of radioisotopes of most of the elements. Accordingly, the chemical industry is now developing new processes and systems which utilize the radiation emitting from radioisotopes in many capacities.

A principal kind of process which is important in many chemical processes is a separation process. Broadly, a separation process can be classified as fractionation processes, with fractional distillation being an outstanding example thereof. The efficiency of a fractionation process is often dependent on the accuracy and effectiveness of its control system. New and more efficient control systems are needed which automatically control fractionation processes so that these processes operate continuously and at their peak efficiency.

It is an object of this invention, therefore, to provide a new system for controlling a fractionation process using the phenomenon of radioactivity.

It is a further object of this invention to provide a method and means for automatically controlling a fractionation process by the use of radioisotopes.

It is still a further object to provide a new system for the use of radioisotopes wherein such radioisotopes are utilized to effect automatic control of a fractionation process. These and other objects will become further apparent from a study of the disclosure which follows.

I have discovered a method and means for continuously controlling the operation of a fractionation process which comprises introducing into the process a radioisotope of one of the materials being separated therein, detecting the concentration of said radioisotope in a selected stream of the process and controlling an operating variable of the process in response to the concentration of the radioisotope so detected.

As was indicated above, the term "fractionation process" is used in its broadest sense in this specification and the appended claims and is intended to cover such processes as fractional distillation, absorption, adsorption, extractive distillation, liquid-liquid contactors, liquid-solid contactors, fractional crystallization, and other processes for the separation of solid, liquid and gaseous materials. My invention is applicable to any process wherein a gaseous, liquid or solid material is separated into its components and a process variable can be controlled in response to the concentration of one of the components in a selected stream in the process.

The radioactive material which is introduced into the process is a radioisotope of one of the constituents being fractionated. In the petroleum industry where my invention has broad application, carbon-14 and tritium (hydrogen-3) can be used widely in the separation of hydrocarbon containing materials. A hydrocarbon having carbon-14 or tritium as one of its atoms and which hydrocarbon is one of a mixture of hydrocarbons being separated is introduced into the separation process, detected in a suitable stream of the process and a process variable controlled in response thereto. In a fractionation process for resolving mixtures of halogen-substituted compounds, molecules of one of the constituents of the process which contain chlorine-36, having a half-like of $4.4 \times 10^5$ years, or iodine-131, having a half-like of 8.0 days, can be used. Halogen-substituted aliphatic and aromatic compounds constitute a large volume of the products of the chemical industry. In processes for the removal of sulfur compounds, e.g. mercaptans, sulfides, disulfides and thiophenes, from petroleum fractions, such as, by liquid-vapor fractionation or liquid-liquid extraction, molecules of one of the constituents tagged with sulfur-35 can be introduced into the system for use in controlling the process in accordance with this invention. Also, molecules tagged with sulfur-35 can be used in the control of the compositions of products from desulfurization units. Other useful radioactive nuclei which can be used are phosphorus-32, having a half-life of 14.3 days, and tin-113, having a half-life of 112 days and this invention is applicable to fractionation processes for all chemical compounds, i.e. organic compounds and inorganic elements and compounds.

A better understanding of my invention can be had by referring to the following description in conjunction with the accompanying drawings in which.

Figure 1:
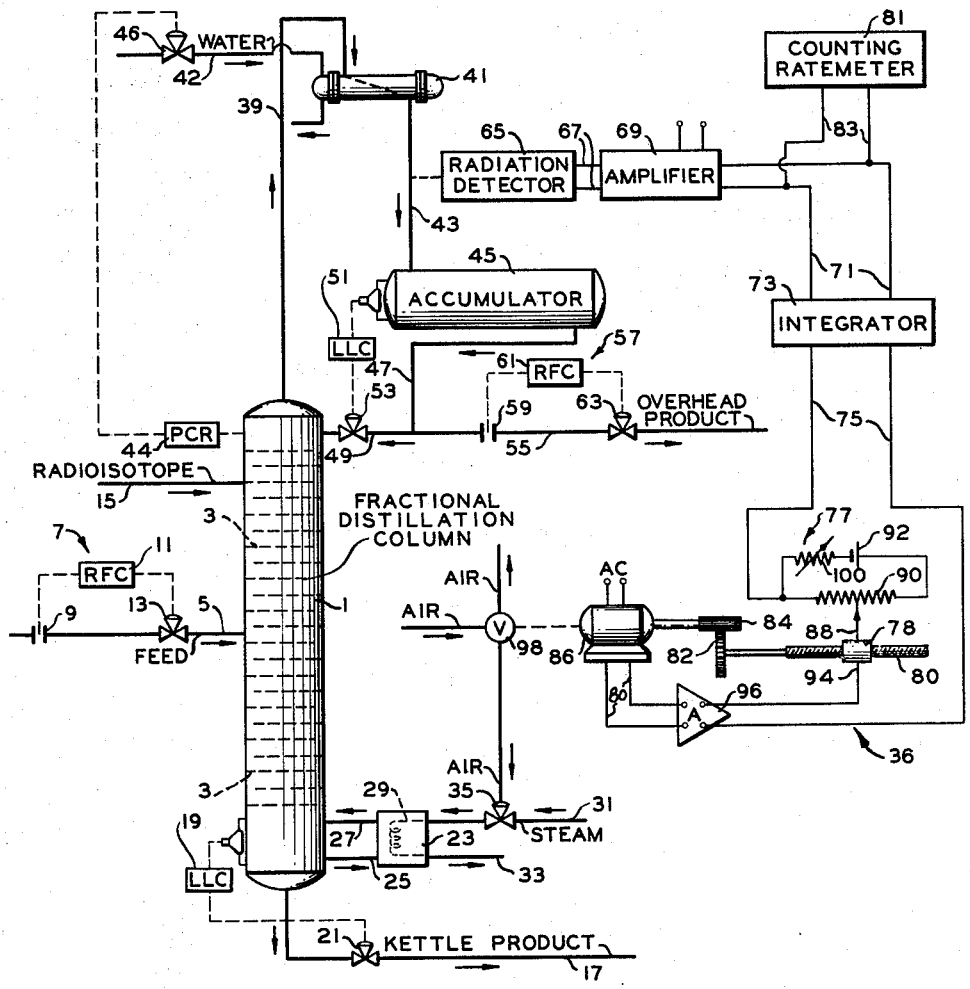
Figure 1 is a schematic flow diagram of a fractional distillation process which is controlled by an embodiment of my invention.

Referring now to Figure 1, there is shown a fractional distillation column 1 having a plurality of bubble decks or trays 3. A feed line 5 is controlled by a flow control means 7, comprising an orifice 9, an air pressure-operated rate of flow controller 11 and a motor valve 13. Line 5 conveys the feed mixture to be separated into column 1 at an intermediate point.

A radioisotope of one of the constituents of the feed mixture is introduced continuously into column 1 via a line 15. As is shown in Figure 1, the radioisotope is introduced continuously into the liquid leaving the third tray from the top of the column. However, the radioisotope can be continuously introduced along with the feed via line 5 or at any other point along column 1. In the event that the radiation detecting device is positioned on a kettle product line, it is preferred that the radioisotope be continuously introduced near the bottom of the column.

A higher boiling constituent of the feed is withdrawn from the bottom of column 1 as kettle product via a line 17. A liquid level controller 19 maintains a liquid level in the bottom of column 1 by regulating the rate of flow of the kettle product through line 17 by operating a motor valve 21 in line 17.

The net heat input to column 1 is provided by a reboiler 23. Liquid from the bottom of column 1 is circulated into reboiler 23 via a line 25 and back into column 1 via a line 27. Steam or other heating fluid is passed into a coil 29 in reboiler 23 via a line 31 and out of reboiler 23 via a line 33.

In accordance with this invention, the rate of flow of the heating fluid in line 31 to reboiler 23 is controlled by a motor valve 35 in line 31 which is actuated by a rate of flow controller designated generally as 36. Rate of flow controller 36 is actuated by a radiation detecting means to be described hereinafter.

The overhead product of column 1 is withdrawn via a line 39 and passed through a condenser 41. Water is passed to condenser 41 through a line 42 and a pressure controller 44 controls the column pressure by actuating a motor valve 46 on line 42. From condenser 41, the overhead product is passed via a line 43 to an accumulator 45. The overhead product is withdrawn from accumulator 45 via a line 47 and a portion thereof is returned to column 1 as reflux via a line 49. A liquid level controller 51 maintains a level of liquid in accumulator 45 by actuating a motor valve 53 which controls line 49. The remainder of the overhead product is passed to storage or other uses via a line 55. The rate of flow of the overhead product in line 55 is controlled by a rate of flow controller 57, comprising an orifice 59, a rate of flow controller 61 and a motor valve 63 actuated by rate of flow controller 61.

In accordance with this invention, a radiation detector 65 measures the concentration of the radioisotope in a selected stream of the process and a process variable is controlled in response to the radioisotope concentration so detected. In Figure 1, radiation detector 65 is shown as detecting the concentration of the radioisotope in line 43 which conveys the overhead product from condenser 41 to accumulator 45, and in response thereto, the flow of steam in line 31 to reboiler 23 is controlled. Obviously, radiation detector 65 can be placed so as to detect the concentration of the radioisotope in the kettle product in line 25, if desired. In other fractionation processes, the radiation detector can be placed so as to detect the concentration of the radioisotope in any selected stream upon which a valid operating system can be based for the process.

Examples of suitable radiation detectors are of scintillation detector and a Geiger-Mueller detector and installation of a scintillation detector in line 43 is illustrated and described hereinafter in connection with Figure 2.

Radiation detector 65 produces an output of pulses of energy in response to the concentration of the radioisotope in line 43. The output of detector 65 is connected by a pair of leads 67 to the input of an amplifier 69. The output of amplifier 69 is connected by a pair of leads 71 to the input of an integrater 73. The output of integrater 73 is connected by a pair of leads 75 to the input of the rate of the flow controller 36 which comprises a comparison circuit indicated generally as 77.

In comparison circuit 77 a slider 78 travels on a screw-threaded shaft 80 which is driven through gears 82 and 84 by a reversible, two phase electric motor 86. Slider 78 carries a contact 88 which engages a resistance 90 that is connected across a constant source 92 of current. Contact 88 is connected by a lead 94 to one input terminal of an amplifier 96. The output of integrator 73 is connected by leads 75 to one end of resistance 90 and to the other input terminal of amplifier 96. The output of amplifier 96 is connected by a pair of leads 80 to motor 86. Thus, it is apparent that the potential generated by the radiation detector 65, as reflected by the output of integrator 73, can be balanced by the potential drop across contact 88 and the common end of resistance 90. When these potentials are equal no voltage passes through amplifier 96 to motor 86. Upon a change in the potential generated by the radiation detector 65, such voltage unbalance operates the directionally-responsive amplifier 96 to impress a proportional voltage across motor 86 which causes proper rotation of the shaft 80 until a new balance point is obtained. A manually-set variable resistance 100 is positioned between current source 92 and the common end of resistance 90 to provide a means for adjusting the zero point of the circuit under varying operating conditions of the distillation column.

The rotational movement of motor 86 in driving contact 88 to a new balance point is mechanically linked to operate an air valve 98 which controls the supply of air to motor valve 35 in steam line 31.

Air valve 98 is a constant-bleed type air valve which opens motor valve 35 with increasing air pressure and permits motor valve 35 to close with decreasing air pressure.

It will be apparent to those skilled in the art that the apparatus described in connection with rate of flow controller 36, including the comparison circuit 77, motor 86, amplifier 96 and air valve 98 are conventionally arranged within one instrument, the rate of flow controller 36.

The electrical and mechanical apparatus described above can be defined as a means, responsive to the radiation detecting means, for actuating the control valve in steam line 31. A more detailed description and illustration of such a means and which is well suited for the purpose of the present invention, is shown in Figure 13–V, page 298 et seq. of "The Electronic Control Handbook" by Ralph R. Batcher and William Maulic, published by Caldwell-Clements, Inc., 480 Lexington Avenue, New York 17, New York (1946). In Figure 13–V of the above publication the thermocouple at the upper left of the drawing corresponds to radiation detector 65. The battery and potential divider shown connected in circuit with the thermocouple correspond to the comparison circuit 77, and the balancing motor shown at the right-hand side of Figure 13–V corresponds to the afore-described balancing motor 86 in rate of flow controller 36.

A counting ratemeter 81 can be connected, if desired, by a pair of leads 83 to leads 71 to provide a visual indication of the concentration of the radioisotope at any instant of time in line 43. Such counting ratemeters are available commercially and they also provide an output designed to drive any of the commercially available strip-chart recorders of either the continuous balance or the direct-reading milliammeter variety.

Figure 2:
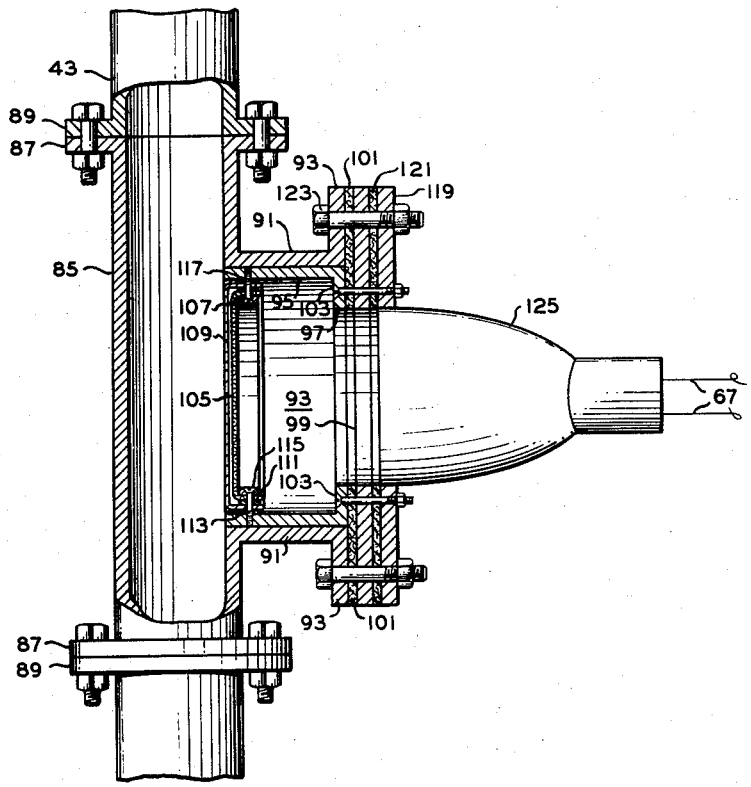
Figure 2 is an enlarged sectional view of a scintillation detector mounted on a transfer line of the apparatus shown in Figure 1.

Referring now to Figure 2, there is shown an apparatus for mounting a scintillation detector in position with respect to line 43 so as to detect the concentration of the radioisotope in the overhead product flowing through line 43.

A section of pipe 85 having flanges 87 is positioned in line 43 by connection to flanges 89 of line 43. Pipe 85 is provided with a man-hole section 91, having a flange 93. The man-hole section 91 thus provides an aperture in pipe 85 of approximately 5 square feet in area.

A chamber 93 for containing the scintillation material, liquid or solid, is disposed within man-hole section 91. The sides of chamber 93 are formed from an annular unit 95 which has a lug 97. A thick glass plate 99 provides a back for chamber 93 by being attached to lug 97. A ring 101 of gasket material is disposed between lug 97 and plate 99 and a plurality of bolts 103 fasten plate 99 to lug 97 to make a pressure-tight seal. A circular disk 105 of wire mesh, having a flexible annular ring 107 welded thereto is disposed across the front of chamber 93 to provide support for a thin radiation window 109 which closes the front of chamber 93. An annular gasket 111 and an annular gasket 113 are positioned on either side of the portion of window 109 which extends between unit 95 and ring 107. A plurality of bolts 115 extend through ring 107, gasket 111, window 109, gasket 113 and into tapped holes 117 in unit 95 to securely fasten these units together and thereby provide a pressure-tight seal at the front of chamber 93.

Window 109 is attached to mesh 105 and is designed from the materials and thicknesses of materials known in the art to be transparent to the radiation present in the process stream being detected. A discussion of the window 109 is given hereinafter, in connection with the discussion of a specific example using the fractional distillation and control apparatus described above.

A flange 119 having a gasket 121 holds plate 99 to flange 93 by means of a plurality of bolts 123.

A photomultiplier tube 125 is placed closely adjacent to plate 99 and provides a means for detecting and multiplying scintillations from the scintillation material in chamber 93. Tube 125 is connected to amplifier 69 as is shown in Figure 1, and thereby provides a voltage which is characteristic of the concentration of the radioisotope in line 43.

Figure 3:
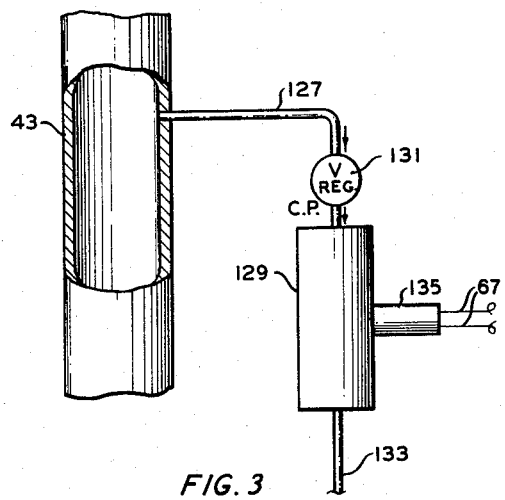
Figure 3 is a schematic drawing which illustrates an installation of a Geiger-Mueller tube in place of the scintillation detector shown in Figure 2.

In the embodiment described above, the scintillation detector and the photomultiplier tube correspond to the radiation detector 65 schematically shown in Figure 1. Broadly, the scintillation detector shown in Figure 2 and the electrical and mechanical control apparatus shown in Figure 1 which regulates the flow of steam in line 31 in response to the detector can be defined as a means for detecting and multiplying an effect of the scintillation from the scintillation material, means for discriminating and indicating the pulse heights of said scintillations whereby an analysis is made of the energy spectrum of the radiations, and means for producing an electrical and mechanical output characteristic of said analysis. Obviously, other specific kinds of radiation detectors can be used, e.g., a Geiger-Mueller tube. Such detectors are commercially available in a wide range of sensitivities. Where the process being controlled operates at a pressure greatly different from atmospheric pressure as is the case in the fractional distillation process shown in Figures 1 and 2, it is necessary that a sample stream having a pressure very close to atmospheric pressure be provided on which the Geiger-Mueller tube can be placed to detect the concentration of the radioisotope. Such an arrangement is schematically shown in Figure 3. A small diameter pipe 127 is in communication with line 43 and conveys a sample of the material passing through line 43 to a cell 129. A constant pressure outlet valve 131 is placed in line 127 and supplies the sample from line 43 to cell 129 at approximately atmospheric pressure. An outlet pipe 133 conveys the sample out of cell 129 to the atmosphere or to any other suitable use. A Geiger-Mueller tube 135 is mounted in the wall of cell 129 so that window of tube 135 is in direct contact with the sample flowing through cell 129. Tube 135 is connected to the amplifier 69, as shown in Figure 1, and provides a voltage or potential which is characteristic of the concentration of the radioisotope in the flowing stream through line 43. Obviously, the change in pressure from line 43 to cell 129 requires that a factor be applied to the output of the tube 135 to obtain the true concentration of the radioisotope in line 43, this factor being the ratio of the pressure in line 43 to the pressure in cell 129.

EXAMPLE

The fractional distillation column shown in Figure 1 is operated and controlled in accordance with this invention by utilizing the controlling apparatus described and shown in Figures 1, 2 and 3 in the separation of a mixture of isobutane and normal butane. The feed mixture, which is half normal butane and half isobutane, enters column 1 via line 5 at the bubble point temperature of the feed. Column 1 operates at a pressure of 100 p.s.i.a. and column 1 is controlled by specifying the quantity and composition of the overhead product therefrom. The radioisotope introduced into column 1 via line 15 is normal butane tagged with carbon-14 or hydrogen-3 (tritium). Radiation detector 65 in Figure 1 is the scintillation detector shown in Figure 2 and the column is controlled by opening and closing motor valve 35 in steam line 31 in accordance with the concentration of the radioisotope detected in line 43 between condenser 41 and accumulator 45.

Presented below in Table I is a compilation of the operating conditions for case I, wherein there is 1.5 mol percent normal butane and 98.5 mol percent isobutane in line 43, and for case II, wherein there is 1.0 mol percent normal butane and 99.0 mol percent isobutane in line 43. Table II, below, presents the composition of the stream leaving the indicated theoretical trays in the top of column 1 in mol percent isobutane.

Table I
OPERATING CONDITIONS FOR FRACTIONAL DISTILLATION OF NORMAL BUTANE-ISOBUTANE MIXTURE

|  | Case I | Case II |
|---|---|---|
| Feed rate, gallons per hour | 10,000 | 10,000 |
| Feed rate, pound moles per hour | 823 | 823 |
| Feed composition, mol percent isobutane | 50 | 50 |
| Overhead product rate, pound moles per hour | 411.5 | 411.5 |
| Overhead composition, mole percent isobutane | 98.5 | 99.0 |
| Kettle product rate, pound moles per hour | 411.5 | 411.5 |
| Kettle product composition, mole percent normal butane | 98.5 | 99.0 |
| Reflux rate, pound moles per hour | 2,915.1 | 3,635.5 |
| Rectifying Section: |  |  |
| Vapor flowing, pound moles per hour | 3,326.6 | 4,047 |
| Liquid flowing, pound moles per hour | 2,915.1 | 3,635.5 |
| Stripping section: |  |  |
| Vapor flowing, pound moles per hour | 3,326.6 | 4,047 |
| Liquid flowing, pound moles per hour | 3,738.1 | 4,458.5 |

Table II
COMPOSITION OF STREAM LEAVING INDICATED THEORETICAL TRAY IN TOP OF COLUMN-MOLE PERCENT ISOBUTANE

|  | Case I | | Case II | |
|---|---|---|---|---|
|  | Liquid | Vapor | Liquid | Vapor |
| Tray 1 | 97.9 | 98.5 | 98.75 | 99.0 |
| Tray 2 | 97.2 | 98.0 | 98.4 | 98.8 |
| Tray 3 | 96.5 | 97.45 | 97.95 | 98.45 |
| Tray 4 | 95.75 | 96.85 | 97.45 | 98.05 |
| Tray 5 | 94.8 | 96.15 | 96.85 | 97.6 |

Some nuclear properties of carbon-14 and hydrogen-3 (tritium) are presented below in Table III.

Table III
SOME NUCLEAR PROPERTIES OF CARBON-14 AND HYDROGEN-3 (TRITIUM)

|  | Carbon-14 | Hydrogen-3 |
|---|---|---|
| Half-life, years | 5,720 | 12.4 |
| Disintegration constant, sec.$^{-1} \times 10^{10}$ | 0.0384 | 17.7 |
| Energy of beta particle, Kev.: |  |  |
| Maximum | 155 | 18 |
| Average | 54 | 6 |
| Range in aluminum of the average beta particle, mg./cm.$^2$ | 5 | 0.1 |

A presentation of the radioisotope requirements, using carbon-14 or hydrogen-3 tagged normal butane is given in Table IV, below.

Table IV
RADIOISOTOPE REQUIREMENTS

|  | Carbon-14 | Hydrogen-3 |
|---|---|---|
| Estimated total range of average beta particle, mg./cm.$^2$ | 5 | 0.1 |
| Range of beta particle in hydrocarbon: |  |  |
| mg./cm.$^2$ | 4 | 0.02 |
| cm. | 0.0075 | 0.000038 |
| Density of liquid overhead product, gr./cc. | 0.533 | 0.533 |
| Volume of hydrocarbon from which detector receives beta particles, cc. | 35.0 | 0.176 |
| Thickness of detector window, mg./cm.$^2$ | 1.0 | 0.03 |
| Area of detector window, cm.$^2$ | 4,645 | 4,645 |
| Number of radioactive nuclei required within range of detector to give 2 disintegrations per second $\times 10^{-10}$ | 52 | 0.113 |
| Concentration of radioactive nuclei: |  |  |
| microcuries/gallon | 0.0057 | 1.15 |
| nuclei/cc. $\times 10^{-10}$ | 1.48 | 0.64 |
| nuclei/gallon $\times 10^{-10}$ | 0.56 | 0.24 |
| Overhead product, gallons/hour | 5,000 | 5,000 |
| Kettle product, gallons/hour | 5,000 | 5,000 |
| Loss of radioactive nuclei in overhead product $\times 10^{-18}$/hour | 0.28 | 0.12 |
| Loss of radioactive nuclei in kettle product $\times 10^{-18}$/hour | 2.24 | 0.96 |
| Total consumption of radioactive nuclei: |  |  |
| nuclei $\times 10^{-18}$ | 2.52 | 1.08 |
| millicuries/hour | 0.26 | 52.0 |

Under the operating conditions set forth for case I in Table I, the number of disintegrations detected is 100. The efficiency of a scintillation beta-detector approaches 100 percent, i.e. essentially every beta particle which enters the scintillation material produces a flash of light. The geometry of the scintillation beta-detector is 1-pi geometry, i.e. half of the beta particles produced from disintegrations within that thickness of hydrocarbon adjacent to the window of the detector, which is equal to the "range" of the beta particle, enters the detector. The lowest count-rate level which is acceptable for the control of the fractional distillation column is from 0.5 to 1.0 count per second which requires from 1 to 2 radioactive disintegrations per second within the "range" of the detector.

With the column operating under the conditions of case I, Table I, normal butane containing molecules which are tagged with either an atom of carbon-14 or hydrogen-3 is continuously introduced into the liquid leaving the third tray from the top of the column, as shown in Figure 1, and the normal butane content of the overhead product is 1.5 mol percent. To change the operation of the column to the conditions of case II wherein there is 1.0 mol percent normal butane in the overhead product, the rate of continuous introduction of the radioisotope is unchanged and, since the settings of the flow controller 57 on the column overhead product and the column pressure controller 44 are not changed, the isobutane concentration in the kettle product is decreased from 1.5 to 1.0 mol percent. To achieve this change in operation of the column the set-point on the rate of flow controller 36 is manually increased so that the rate of steam introduced in the reboiler 23 is increased until the rate of vapor rising in the column is increased from 3327 to 4047 pound mols per hour. The signal from the radioisotope detector 65 and also the voltage from the counting ratemeter 81 is a function of the concentration of the radioactive nuclei in the overhead product passing through line 43. Under the conditions of case I this signal is expressed as 100 counts per minute. When the operating conditions of the column are changed to case II, the signal is 55 counts per minute. This is calculated by the following simple equation:

$$\begin{pmatrix}\text{Signal from}\\ \text{radioisotope}\\ \text{detector}\end{pmatrix}_{\text{Case II}} = \begin{pmatrix}\text{Signal from}\\ \text{radioisotope}\\ \text{detector}\end{pmatrix}_{\text{Case I}}$$

$$\times \frac{3327}{4047} \times \frac{1.0}{1.5} = 0.55$$

Thus, under the conditions of case II the signal from the radioisotope detector is 55 percent of the signal for case I, 100 counts per minute, or 55 counts per minute.

After equilibrium operating conditions have been reached in the column under the conditions of case II, the concentration of normal butane in the column overhead is checked by a laboratory fractional distillation analysis or other suitable analysis. When the rate of steam introduction in line 31 has been established which produces the desired column operating conditions, the variable resistance 100 in rate of flow controller 36 is manually adjusted so that comparison circuit 77 is at its zero point.

The scintillation material in chamber 93 of the scintillation detector shown in Figure 2 can be a liquid, such as para-terphenyl in phenylcyclohexane, or a solid such as anthracene. Other solid scintillation materials can be used having regard for the kind or radiation being detected, such as, for example, silver-activated zinc sulfide, used for the measurement of alpha radiation, and thallium-activated sodium iodide used for measuring gamma radiation. Other liquid scintillation materials can be used also, such as terphenyl-xylene, terphenyl-dioxane and 2,5-diphenyloxazole-xylene for beta and gamma radiation measurement. Broadly, the scintillation material can be defined as a material capable of scintillating under the effect of the radioisotope in the process stream flowing past the radioisotope detector.

The window 105 in the scintillation detector shown in Figure 2 can be a sheet of thin aluminum and must not have a thickness greater than 4 milligrams per square centimeter when carbon-14 is used as the radioactive atom or 0.08 milligram per square centimeter when hydrogen-3 is used. Since the window requirements are more severe in the case of hydrogen-3 I prefer to use carbon-14 as the radioactive atom in the radioisotope.

The advantages of this invention will be immediately apparent to those skilled in the art. For example, an advantage is the very large change in the intensity of the signal passing to the detector which occurs for a relatively small change in the composition of the process stream being detected. In the example set forth above a change in composition of the material in line 43 from 1.5 mol percent normal butane, case I, to 1.0 mol percent normal butane, case II, produces a change in the signal of from 100 counts per minute to 55 counts per minute is produced. Such a large change in the signal is easily observable and makes it possible to effect very close and sensitive control of the process. A further advantage is the flexibility of the control system. Any selected stream of a process can be used to detect the radioisotope and on which to base the control system. A wide variety of radioactive materials is currently available and the supply will increase tremendously in the coming years. Thus, the radioactive material can be selected which is best suited to the control of the process involved to afford close control of the process at peak efficiency.

Furthermore, the use of carbon-14 or hydrogen-3 in a plant to control a process does not create any hazard to personnel, either in the air about the process equipment or in the products of the process. For example, the concentration of carbon-14 in the vaporized overhead product of the process illustrated herein is only one percent of that concentration of carbon-14 which is considered to be prohibitive. Also, the concentration of hydrocarbons in the air about a refinery is less than one percent, so the concentration of the radioactivity in the air is less than 0.01 percent of the limiting value.

Many variations, improvements and substitutions can be made by those skilled in the art in the light of this disclosure without departing from the spirit or scope of this invention.

I claim:

1. A method for controlling a process variable in a fractionation process which comprises, introducing into said process a radioisotope of one of the materials being separated in said process, detecting the concentration of said radioisotope in a stream of the process and controlling said process variable in response to the concentration of said radioisotope in said stream.

2. A method for controlling a process variable in a fractionation process for separating a mixture of materials including a hydrocarbon, which comprises, introducing into said process a radioisotope of said hydrocarbon, detecting the concentration of said radioisotope in a stream of the process and controlling said process variable in response to the concentration of said radioisotope in said stream to maintain a constant predetermined concentration of said radioisotope in said stream.

3. A process according to claim 2 wherein said radioisotope is a hydrocarbon having carbon-14 as an atom thereof.

4. A process according to claim 2 wherein said radioisotope is a hydrocarbon having hydrogen-3 as an atom thereof.

5. A method for controlling a process variable in a fractionation process for separating a mixture of materials containing a halogen-substituted material, which comprises, introducing into said process a radioisotope of said halogen-substituted material, detecting the concentration of said radioisotope in a stream of the process and controlling said process variable in response to the concentration of said radioisotope in said stream.

6. A process according to claim 5 wherein said radioisotope is a halogen-substituted hydrocarbon having chlorine-36 as an atom thereof.

7. A process according to claim 5 wherein said radioisotope is a halogen-substituted hydrocarbon having iodine-131 as an atom thereof.

8. A method for controlling a process variable in a fractionation process for separating a mixture of petroleum compounds including a sulfur-substituted compound, which comprises, introducing into said process a radioisotope of said sulfur-35 as an atom thereof, detecting the concentration of said radioisotope in a stream of said process and controlling said process variable in response to the concentration of said radioisotope in said stream.

9. A method for controlling a fractional distillation process for the separation of petroleum fractions, which comprises, introducing into said process a radioisotope of a material in a selected stream of said process, placing a radiation detector in said selected stream, measuring the intensity of the radiation detected in said stream, and controlling the net heat input to said process in accordance with said measured radiation intensity.

10. A method for controlling a fractional distillation process for the separation of petroleum fractions which comprises, introducing into said process a radioisotope of a material in a selected stream of said process, placing a radiation detector comprising a material capable of scintillating under the effect of radiation from said radioisotope in said selected stream, detecting and mulitplying an effect of the scintillations from said scintillating material, discriminating the pulse heights of said scintillations whereby an analysis is made of the energy spectrum of the radiations from said radioisotope, and controlling the net heat input to said process in accordance with said analysis.

11. A method for controlling the net heat input to a fractional distillation column for separating a lower boiling hydrocarbon from a mixture of said lower boiling hydrocarbon and a higher boiling hydrocarbon wherein a small amount of said higher boiling hydrocarbon is produced in an overhead stream of said column, which comprises, introducing a radioisotope of said higher boiling hydrocarbon near the top of said column, placing a radiation detector comprising a material capable of scintillating under the effect of radiation from said radioisotope in said overhead stream, detecting and multiplying an effect of the scintillations from said scintillating material, discriminating the pulse heights of said scintillations whereby an analysis is made of the energy spectrum of the radiations from said radioisotope, and controlling the net heat input to said column in accordance with said analysis.

12. A method according to claim 11 wherein said radioisotope has carbon-14 as an atom thereof.

13. A method according to claim 11 wherein said radioisotope has hydrogen-3 as an atom thereof.

14. An apparatus for controlling an operating variable of a process for fractionating a material into its constituents, which comprises, means for introducing a radioisotope of one of said constituents into said process, a radiation detecting means positioned so as to detect said radioisotope in a selected stream of said process, and means responsive to said radiation detecting means for controlling said operating variable of said process.

15. An apparatus for controlling the heat input to a fractional distillation column, which comprises, means for introducing a radioisotope of a constituent of the material being fractionally distilled into said column, a radiation detecting means positioned so as to detect said radioisotope in a selected stream of said column, and means responsive to said radiation detecting means for controlling said heat input to said column.

16. An apparatus according to claim 15 wherein said radiation detecting means is a scintillation detector.

17. An apparatus according to claim 15, wherein said radiation detecting means is a Geiger-Mueller tube.

18. An apparatus for controlling the heat input to a fractional distillation column, which comprises, means for introducing a radioisotope of a constituent of the material being fractionally distilled into said column, a scintillation detector positioned so as to detect said radioisotope in a selected stream of said column, means for detecting and multiplying an effect of the scintillations from said scintillation detector, means for discriminating and indicating the pulse heights of said scintillations whereby an analysis is made of the energy spectrum of the radiations from said radioisotope, means for producing an electrical and mechanical output characteristic of said analysis, and means, responsive to the last-mentioned output producing means for controlling said heat input to said column.

19. A method for controlling the fractional distillation of a normal butane-isobutane mixture which comprises introducing said mixture to a fractionation zone, supplying heat to the bottom of said zone and withdrawing heat from the top thereof to effect fractionation of the mixture, withdrawing isobutane overhead from the fractionation zone, withdrawing normal butane as a bottom product, introducing a stream of normal butane containing the isotope carbon-14 into the column at a region adjacent the upper end thereof, continuously detecting the radioactivity of the overhead stream and producing an output representative of said radioactivity, and controlling the heat input to the bottom of the column in accordance with said output so as to maintain said output at a predetermined value.

20. Fractional distillation apparatus comprising, in combination, a fractionation column having an overhead withdrawal line, a bottom product withdrawal line, and a feed conduit intermediate said lines, a reboiler connected to the bottom portion of said column, a steam line passing through said reboiler to supply heat to the column, a valve in said steam line, servomechanism controlling said valve including a servomotor connected thereto, a bridge circuit having a variable circuit component connected to said motor, and an amplifier connected to said bridge circuit and said motor whereby the motor maintains the bridge in balanced condition, a radiation detector connected to the overhead line of said fractionation column, an amplifier connected to said detector and responsive to the output thereof, an integrator having its input circuit connected to said amplifier and its output circuit connected to said bridge, whereby the servomechanism varies the heat input to the column to maintain a constant amount of radioactivity at said detector, and a line for introducing a radioactive tracer material into said column.

References Cited in the file of this patent

UNITED STATES PATENTS

| | | |
|---|---|---|
| 2,674,363 | Graham | Apr. 6, 1954 |
| 2,686,266 | Pringle et al. | Aug. 10, 1954 |
| 2,744,199 | Juterbock et al. | May 1, 1956 |

OTHER REFERENCES

Using Radioactivity in Refinery Control, Gester, Jr., et al., from Petroleum Processing, vol. 8, No. 4, April 1953, pages 550 to 552.

Radioactive Isotopes as Tracers, by A. W. Kramer, from Power Plant Engineering, November 1947, pages 105 to 108.